(12) United States Patent
Dammen et al.

(10) Patent No.: US 11,324,159 B2
(45) Date of Patent: May 10, 2022

(54) METHOD AND SYSTEMS FOR SEED TREATMENT APPLICATIONS

(71) Applicants:PIONEER HI-BRED INTERNATIONAL, INC., Johnston, IA (US); E. I. DU PONT DE NEMOURS AND COMPANY, Wilmington, DE (US)

(72) Inventors: Michael Dammen, Urbandale, IA (US); Jeffrey Lee Daniels, West Des Moines, IA (US); William L Geigle, Wilmington, DE (US); Sean Fuller McCaffery, Indianapolis, IN (US); Randy Seaba, Waukee, IA (US)

(73) Assignees: PIONEER HI-BRED INTERNATIONAL, INC.; E. I. DU PONT DE NEMOURS AND COMPANY

( * ) Notice: Subject to any disclaimer, the term of this patent is extended or adjusted under 35 U.S.C. 154(b) by 638 days.

(21) Appl. No.: 15/754,910

(22) PCT Filed: Aug. 23, 2016

(86) PCT No.: PCT/US2016/048218
§ 371 (c)(1),
(2) Date: Feb. 23, 2018

(87) PCT Pub. No.: WO2017/035152
PCT Pub. Date: Mar. 2, 2017

(65) Prior Publication Data
US 2018/0352719 A1    Dec. 13, 2018

Related U.S. Application Data

(60) Provisional application No. 62/209,179, filed on Aug. 24, 2015.

(51) Int. Cl.
| A01C 1/06 | (2006.01) |
| A01N 25/00 | (2006.01) |
| A01C 1/00 | (2006.01) |
| A01N 43/56 | (2006.01) |
| A01N 43/76 | (2006.01) |

(52) U.S. Cl.
CPC .............. *A01C 1/06* (2013.01); *A01C 1/00* (2013.01); *A01N 25/00* (2013.01); *A01N 43/56* (2013.01); *A01N 43/76* (2013.01)

(58) Field of Classification Search
CPC .. A01C 1/06; A01C 1/00; A01N 43/56; A01N 43/76; A01N 25/00
See application file for complete search history.

(56) References Cited

U.S. PATENT DOCUMENTS

| 4,554,887 | A | 11/1985 | Yoakam et al. |
| 4,905,411 | A | 3/1990 | Finch-Savage |
| 6,202,346 | B1 | 3/2001 | Lyons et al. |
| 2009/0075325 | A1 | 3/2009 | Das et al. |
| 2011/0100079 | A1 | 5/2011 | Kamei |
| 2012/0183675 | A1* | 7/2012 | Reineccius ............... A01C 1/00 427/4 |
| 2013/0273236 | A1 | 10/2013 | Reineccius et al. |
| 2013/0324399 | A1 | 12/2013 | Riggs et al. |
| 2014/0083358 | A1 | 3/2014 | Reineccius et al. |
| 2014/0173979 | A1 | 6/2014 | Smith |

FOREIGN PATENT DOCUMENTS

| DE | 4128258 A1 | 2/1993 | |
| EP | 0352031 B1 | 4/1992 | |
| ES | 2043481 B1 | 12/1993 | |
| WO | WO-2012078918 A2 * | 6/2012 | ......... G06Q 10/0631 |
| WO | 2014/150574 A1 | 9/2014 | |

OTHER PUBLICATIONS

The International Search Report and Written Opinion of the International Searching Authority for PCT/US16/48218, dated Jan. 19, 2017.
Supplementary European Search Report, EP16839994, Completion of Search Mar. 18, 2019.
Supplemental European Search Report, dated Sep. 30, 2020.

* cited by examiner

*Primary Examiner* — Sue X Liu
*Assistant Examiner* — Andriae M Holt

(57) ABSTRACT

Methods and systems to improve application of seed applied components to seeds are disclosed. Environmentally controlled enclosures to test, evaluate and develop seed treatment solutions for certain geographical locations are provided. Controlled environments during seed treatment application process in a production location improves the overall seed treatment efficiency and uniformity.

8 Claims, 3 Drawing Sheets

METHOD AND SYSTEMS FOR SEED TREATMENT APPLICATIONS

FIELD

The field relates to application of seed treatments.

BACKGROUND

Crop seeds that are planted for agricultural purposes are treated with a variety of seed treatment products that offer benefit from early season pests and diseases in addition to enhancing seed germination and seedling vigor. These seed treatment products include for example, fungicides, insecticides, nematicides, biologicals and other components that improve general plant health. Treatments can also include nutrients including fertilizer. Crop seeds are often treated at production plants where the seeds are routinely produced and packaged for distribution. Crop seeds are also treated at retail locations and on-farm locations where applicable. Applying seed treatment products to seeds depend on a variety of environmental factors such as temperature, humidity, atmospheric pressure and others. Over or under application of seed treatment products may result in discarding treated seeds and operational inefficiency. Such environmental factors vary across geographies and impact seed treatment applications that involve more than one seed treatment product. Therefore, controlling such environmental factors during seed treatment applications or developing formulations that work better in certain environmental conditions are desirable.

SUMMARY

A method of applying one or more components to a plurality of seeds, the method includes providing the one or more components and coating the one of more components to the plurality of seeds in a seed treating equipment, wherein in the seed treating equipment is housed in an environmentally controlled chamber and wherein the chamber is designed to modulate one or more environmental conditions selected from the group consisting of temperature, humidity, and barometric pressure.

A method of controlling humidity and temperature during a seed treatment operation, the method includes (a) applying one or more seed treatment products to a plurality of seeds wherein the seed treatment application is performed using a seed treatment equipment substantially housed within an environmentally controlled chamber; and (b) controlling the humidity and temperature during the seed treatment operation and wherein the humidity and temperature are selected to optimize the seed treatment operation for the seed treatment products.

A method of developing a seed treatment product, the method includes (a) applying one or more test seed treatment formulations to a plurality of seeds wherein the seed treatment application is performed using a seed treatment equipment substantially housed within an environmentally controlled chamber; (b) modulating one or more environmental conditions selected from the group consisting of temperature, humidity, and barometric pressure during the seed treatment operation; and (c) developing the seed treatment product based on the performance of the test seed treatment formulations in the tested environmental conditions.

A method of treating seeds in a production plant with one or more seed treatment products, the method includes (a) applying the one or more seed treatment products to the seeds in a continuous flow seed treating equipment, wherein the seed treating equipment is substantially housed within an environmentally controlled enclosure and the seed treating equipment handles continuous flow of seeds; and (b) maintaining the temperature and/or humidity in the enclosure to a previously determined optimal range during the seed treatment application.

An environmentally controlled seed treatment system for treating seeds at a production location or a testing location, the system includes:
 a. a seed treating equipment configured to apply a plurality of seed applied components to a plurality of seeds;
 b. a climate controlled chamber to substantially enclose the seed treating equipment, wherein the chamber is capable of maintaining a desired range of temperatures and humidity for a particular seed treatment recipe;
 c. a sensor disposed within the chamber, the sensor selected from the group consisting of temperature, humidity, barometric pressure, and air flow sensors;
 d. a plurality of containers having the plurality of seed applied components to apply the seed applied components into the seed treating equipment; and
 e. conveyor system to transfer the plurality of seeds treated with the seed applied components.

A method of treating seeds at a seed production facility for delivery of the treated seeds to a customer, the method includes: providing a seed treatment recipe comprising one or more seed applied components; maintaining appropriate temperature and humidity based on the seed treatment recipe in an area enclosing a seed treatment equipment; and operating the seed treatment equipment to produce treated seeds for the customer.

In an embodiment, the environmental condition is modulated based on previously determined optimal environmental conditions. In an embodiment, the optimal conditions are based on geographical location, timing of application, presence or absence of one or more seed applied components or formulations thereof, type of seeds, seed size, seed shape, volume of seeds being treated, seed treatment rate, nature of the seed treating equipment and volume of the chamber.

In an embodiment, the seeds are selected from the group consisting of corn, soybean, canola, rice, wheat, sorghum, sunflower and alfalfa.

In an embodiment, the coating is performed in a continuous flow seed treating equipment.

In an embodiment, the coating is performed in a batch seed treating equipment

In an embodiment, the chamber containing the seed treating equipment is portable.

In an embodiment, a sensor selected from the group consisting of temperature, humidity, barometric pressure, air flow, and a combination thereof is disposed within the chamber. In an embodiment, the sensor is not disposed within the seed treating equipment.

In an embodiment, the treating drum portion of the seed treating equipment is housed within the environmentally controlled chamber.

In an embodiment, the seed treatment products are in containers that are positioned outside the environmentally controlled chamber.

In an embodiment, the environmental conditions are based on humidity and temperature values suitable for a geographical region where the seed treatment operation is performed.

In an embodiment, the performance of the test seed treatment formulation is evaluated based on a criteria selected from the group consisting of flowability, plantability, tachyness, seed coating uniformity, dust-off levels, application accuracy of labeled rates and treated seed appearance.

In an embodiment, the test formulation for seed treatment is evaluated at a particular humidity level in the chamber, wherein the humidity level is predetermined based on historical humidity levels for a particular geographical region.

In an embodiment, the humidity in the chamber is adjusted based on a binder or a polymer used in the seed treatment operation.

In an embodiment, the seed treatment equipment comprises a portion where the seed treatment products contact the seeds and wherein the portion is positioned within the environmentally controlled enclosure.

In an embodiment, the humidity within the enclosure is set based on the seed treatment product.

In an embodiment, the humidity within the enclosure is controlled based on the type of seed that is being treated.

In an embodiment, the seed treatment system includes a seed treatment equipment that is a continuous flow seed treater. In an embodiment, the seed treatment equipment is an unitized batch treater. In an embodiment, the seed treatment equipment comprises a drum treater. In an embodiment, the seed treatment system includes receiving stations for the plurality of stations that are positioned outside the climate controlled chamber.

In an embodiment, the plurality of stations include a seed treatment product selected from the group consisting of an insecticide, a fungicide, and a biological component.

In an embodiment, the sensor is connected to a remote computer network.

In an embodiment, the a conveyor system transfers treated seeds to a seed drying station.

A method of applying a seed treatment product to a plurality of corn seeds at a production plant, the method includes:
 a. providing a plurality of corn seeds and one or more seed treatment products;
 b. contacting the corn seeds with the one or more seed treatment products in a seed treatment equipment, wherein the seed treatment equipment is positioned within a climate controlled enclosure; and
 c. maintaining an appropriate temperature and humidity in the climate controlled enclosure during the seed treatment application, wherein the temperature and humidity is set based on a prior evaluation with one or more seed treatment products.

In an embodiment, the corn seeds are hybrid seeds. In an embodiment, the corn seeds are inbred seeds. In an embodiment, the corn seeds are transgenic seeds comprising a trait selected from the group consisting of herbicide tolerance, insect resistance, and an agronomic trait.

In an embodiment, one or more seed treatment products comprise an insecticide selected from the group consisting of thiamethoxam, clothianidin, chlorantraniliprole, cyantraniliprole, butenolide, and acetamprid. In an embodiment, one or more seed treatment products comprise a fungicide selected from the group consisting of azoxystrobin, fludioxonil, mefenoxam, thiabendazole, tebuconazol, penthiopyrad and oxathiapiprolin.

A method of increasing crop yield, the method includes:
 a. treating a plurality of crop seeds with one or more seed treatment products, wherein the treating is performed using a seed treating equipment positioned within a climate controlled enclosure such that the seed treatment products applied to the seeds are within about −2% to about +2% as compared to the label application rate; and
 b. providing the treated seeds to a crop growing customer for planting in a crop growing environment, thereby increasing the crop yield.

In an embodiment, the seed treatment products applied to the seeds are within about −1% to about +1% or within about −0.5% to about +0.5% of the label application rate.

In an embodiment, the climate controlled enclosure comprises a humidity sensor. In an embodiment, the climate controlled enclosure is capable of adjusting temperature and humidity based on the type of seed treatment products used.

An environmentally controlled seed treatment system at a seed production facility for delivery of treated seeds to a grower, the system comprising:
 a. a seed treating equipment configured to apply a plurality of seed applied components to a plurality of seeds;
 b. a first climate controlled chamber to substantially enclose the seed treating equipment, wherein the chamber is capable of maintaining a desired range of temperatures and humidity;
 c. a sensor disposed within the chamber, the sensor selected from the group consisting of temperature, humidity, barometric pressure, and air flow sensors.

In an embodiment, the seed treatment equipment in the environmentally controlled seed treatment system is a continuous flow seed treater. In an embodiment, the seed treatment equipment in the environmentally controlled seed treatment system is an unitized batch treater. In an embodiment, the seed treatment equipment in the environmentally controlled seed treatment system comprises a drum treater.

In an embodiment, the chamber is capable of maintaining a temperature range that is about 10° C. to about 22° C. when the seed treating equipment is in operation. In an embodiment, the chamber is capable of maintaining a humidity range that is about 30% to about 40% humidity when the seed treating equipment is in operation.

In an embodiment, the chamber is capable of maintaining a temperature range that is equal to or less than about 25° C. and a humidity range that is equal to or less than 40% humidity when the seed treating equipment is in operation. In an embodiment, the seed treatment system includes both a temperature and a humidity sensor. In an embodiment, the seed treatment system further includes an air flow sensor. In an embodiment, the seed treatment further comprises a barometric pressure sensor.

In an embodiment, the seed treatment system further includes at least one seed treatment product storage station positioned in the first climate controlled chamber.

In an embodiment, the seed treatment system further includes at least one seed treatment product storage station positioned in a second climate controlled chamber located outside the first climate controlled chamber.

An environmentally controlled seed treatment system at a seed production facility for delivery of treated seeds to a grower, the system includes:
 a. a seed treating equipment configured to apply a plurality of seed applied components to a plurality of seeds;
 b. a plurality of climate controlled chambers to substantially enclose the seed treating equipment, wherein the plurality of the chamber are capable of maintaining a plurality of desired ranges of temperatures and humidity;
 c. a sensor disposed within the chamber, the sensor selected from the group consisting of temperature, humidity, barometric pressure, and air flow sensors.

DETAILED DESCRIPTION

Figure 1:
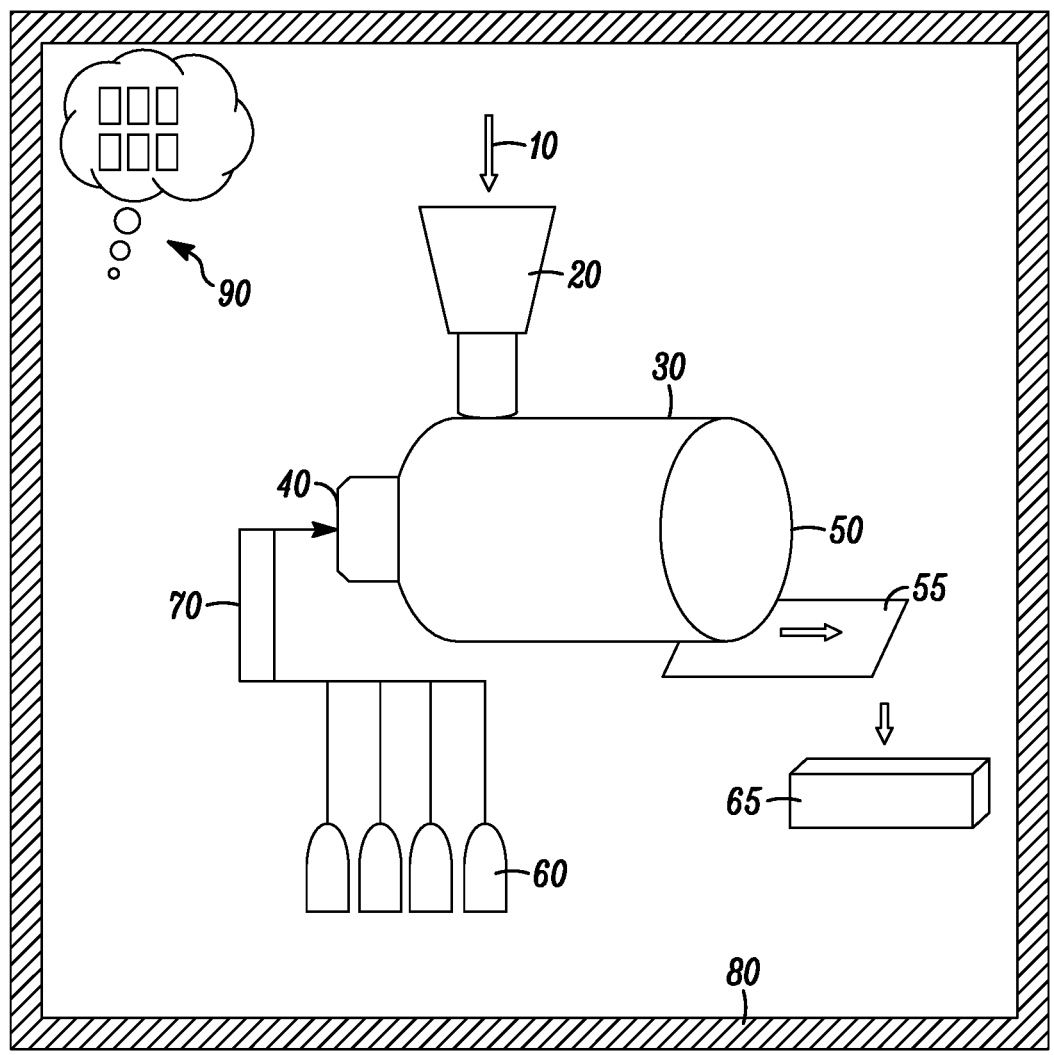
FIG. 1 shows a schematic illustration of a seed treatment application system in an environmentally controlled enclosure.

Methods and systems for seed treatment applications are disclosed.

The contents and disclosures of priority application, U.S. Ser. No. 62/209,179 are incorporated herein by reference.

In an embodiment, a method of applying one or more components to a plurality of seeds includes providing the one or more components and coating the one of more components to the plurality of seeds in a seed treating equipment, wherein the seed treating equipment is housed in an environmentally controlled chamber and wherein the chamber is designed to modulate one or more environmental conditions selected from the group consisting of temperature, humidity, and barometric pressure. In an embodiment, the chamber is a climate controlled room within an existing facility. In an embodiment, the chamber is a climate controlled facility that can maintain a desired operating ranges of humidity and temperatures.

A method of controlling humidity and temperature during a seed treatment operation includes (a) applying one or more seed treatment products to a plurality of seeds wherein the seed treatment application is performed using a seed treatment equipment substantially housed within an environmentally controlled chamber; and (b) controlling the humidity and temperature during the seed treatment operation and wherein the humidity and temperature are selected to optimize the seed treatment operation for the seed treatment products. In an embodiment, the environmentally controlled chamber partially houses the seed treating equipment such that only the drum portion is climate-controlled as opposed to the entire seed treating equipment including the hopper and the conveyor systems.

A method of developing a seed treatment product includes (a) applying one or more test seed treatment formulations to a plurality of seeds wherein the seed treatment application is performed using a seed treatment equipment substantially housed within an environmentally controlled chamber; (b) modulating one or more environmental conditions selected from the group consisting of temperature, humidity, and barometric pressure during the seed treatment operation; and (c) developing the seed treatment product based on the performance of the test seed treatment formulations in the tested environmental conditions. Factors such as temperature and humidity are varied incrementally and the performance characteristics of one or more seed treatment formulations are evaluated. In an embodiment, the active ingredient (e.g., an insecticide or a fungicide or a combination of both) concentration is kept constant while other components such as application rate, polymer type/amount and any binders are varied. In an embodiment, the active ingredient concentration is also adjusted to get a desirable loading concentration (e.g., µg a.i./seed).

A method of treating seeds in a production plant with one or more seed treatment products, the method includes (a) applying the one or more seed treatment products to the seeds in a continuous flow seed treating equipment, wherein the seed treating equipment is substantially housed within an environmentally controlled enclosure and the seed treating equipment handles continuous flow of seeds; and (b) maintaining the temperature and/or humidity in the enclosure to a previously determined optimal range during the seed treatment application. In an embodiment, the optimal range is determined by evaluating the seed treatment products within a desirable range of temperature and humidity to achieve a desired loading rate, appearance, dust-off levels, retention of active ingredients on the seed, and bioavailability of any biological components.

An environmentally controlled seed treatment system for treating seeds at a production location or a testing location includes:

a. a seed treating equipment configured to apply a plurality of seed applied components to a plurality of seeds;

b. a climate controlled chamber to substantially enclose the seed treating equipment, wherein the chamber is capable of maintaining a desired range of temperatures and humidity for a particular seed treatment product or a seed treatment recipe that includes more than product;

c. a sensor disposed within the chamber, the sensor selected from the group consisting of temperature, humidity, barometric pressure, and air flow sensors;

d. a plurality of containers having the plurality of seed applied components to apply the seed applied components into the seed treating equipment; and e. conveyor system to transfer the plurality of seeds treated with the seed applied components.

In an embodiment, the one or more seed treatment products may be pre-mixed or mixed at the site of treating before being applied inside the seed treatment equipment. In an embodiment, the containers comprise a prescriptive seed treatment system where an appropriate amount of one or more seed applied component to be automatically injected in a closed loop system into the seed treatment equipment. In an embodiment, the prescriptive seed treatment system is controlled by a remote computer server capable of providing instructions and obtaining data regarding the seed treatment products used to and from the prescriptive seed treatment system. Such automated seed treatment systems are adaptable for production location as well as on site operations at a customer or retail level.

In an embodiment, a sensor disposed within the climate-controlled chamber or enclosure is in communication through a computer network to feed data such that the seed treatment application can be controlled. For example, data from one or more sensors disposed within the chamber are analyzed to adjust the seed treatment application rate, addition or removal of one or more components such as a binder from the seed treatment recipe.

A method of treating seeds at a seed production facility for delivery of the treated seeds to a customer, the method includes: providing a seed treatment recipe comprising one or more seed applied components; maintaining appropriate temperature and humidity based on the seed treatment recipe in an area enclosing a seed treatment equipment; and operating the seed treatment equipment to produce treated seeds for the customer. In an embodiment, the area enclosing the seed treatment equipment is a room with HVAC (heating, ventilation, air conditioning) systems to maintain a desired range of humidity and temperature.

In an embodiment, the environmental condition is modulated based on previously determined optimal environmental conditions. In an embodiment, the optimal conditions are based on geographical location, timing of application, presence or absence of one or more seed applied components or formulations thereof, type of seeds, seed size, seed shape, volume of seeds being treated, seed treatment rate, nature of the seed treating equipment and volume of the chamber.

In an embodiment, the seeds that are treated or coated with a seed treatment product or a seed applied component are selected from the group consisting of corn, soybean, canola, rice, wheat, sorghum, sunflower and alfalfa.

In an embodiment, the coating is performed in a continuous flow seed treating equipment. Continuous flow seed treating equipment are available commercially from vendors. For example, a commercial continuous flow seed treating equipment may include a distribution device that modulates the incoming seed flow rates and appropriately distributes the seed flow into a uniform seed layer where the seed treatment products are applied. seed treating equipment may include an applicator head or an atomizer disc to atomizes and apply a uniform, even distribution of the seed applied components to the seed layer (or a screen of seeds) to coat the seed and further progress the seed treatment process within the drum. In an embodiment, the seed treating equipment may include a drum that mixes the seeds coated with the seed treatment products, using mixing paddles and distribution baffles to control the flow of treated seed. In an embodiment, during the discharge process, treated seeds are transferred to the conveyor system.

In an embodiment, the coating is performed in a batch seed treating equipment. In an embodiment, the chamber containing the seed treating equipment is portable.

In an embodiment, the chamber comprises a sensor selected from the group consisting of temperature, humidity, barometric pressure, and air flow. The sensors may be connected to a common network to feed data that enables the microprocessor-based control systems to accordingly adjust the temperature, humidity, air flow, and barometric pressure to maintain a desired range within the enclosure. The environmental conditions present within the enclosure or the climate-controlled chamber can also be adjusted depending on the micro-climate conditions present within the seed treating equipment, e.g., inside the drum of a seed treater.

In an embodiment, the treating drum portion of the seed treating equipment is housed within the environmentally controlled chamber. In an embodiment, the seed treatment products are in containers that are positioned outside the environmentally controlled chamber. In an embodiment, the environmental conditions are based on humidity and temperature values suitable for a geographical region where the seed treatment operation is performed.

In an embodiment, the performance of the test seed treatment formulation is evaluated based on a criteria selected from the group consisting of flowability, plantability, tachyness, seed coating uniformity, retention of active ingredients, dust-off levels, application accuracy of labeled rates and treated seed appearance.

In an embodiment, the test formulation for seed treatment is evaluated at a particular humidity level in the chamber, wherein the humidity level is predetermined based on historical humidity levels for a particular geographical region. Historic humidity levels for a particular location and time of the year are obtained from weather reporting station records. Similarly, historic temperature levels are also obtained from such weather reports. Based on the those weather data, conditions prevailing within a seed treatment facility e.g., a building, is modeled to obtain ranges of operating weather conditions that exist during seed treatment operations in the building.

In an embodiment, the humidity in the chamber is adjusted based on a binder or a polymer used in the seed treatment operation. In an embodiment, the seed treatment equipment comprises a portion where the seed treatment products contact the seeds and wherein the portion is positioned within the environmentally controlled enclosure. In an embodiment, humidity levels within the chamber may impact the flow of the seed treatment slurry and how uniform of a coating the seeds get during the seed treatment process. In an embodiment, based on the In an embodiment, the humidity within the enclosure is set based on the seed treatment product. In an embodiment, the humidity within the enclosure is controlled based on the type of seed that is being treated.

In an embodiment, the seed treatment system includes a seed treatment equipment that is a continuous flow seed treater. In an embodiment, the seed treatment equipment is an unitized batch treater. In an embodiment, the seed treatment equipment comprises a drum treater. In an embodiment, the seed treatment system includes receiving stations for the plurality of stations that are positioned outside the climate controlled chamber.

In an embodiment, the plurality of stations include a seed treatment product selected from the group consisting of an insecticide, a fungicide, and a biological component.

In an embodiment, the sensor is connected to a remote computer network.

In an embodiment, the a conveyor system transfers treated seeds to a seed drying station.

A method of applying a seed treatment product to a plurality of corn seeds at a production plant, the method includes:

a. providing a plurality of corn seeds and one or more seed treatment products;

b. contacting the corn seeds with the one or more seed treatment products in a seed treatment equipment, wherein the seed treatment equipment is positioned within a climate controlled enclosure; and c. maintaining an appropriate temperature and humidity in the climate controlled enclosure during the seed treatment application, wherein the temperature and humidity is set based on a prior evaluation with one or more seed treatment products.

In an embodiment, the corn seeds are hybrid seeds. In an embodiment, the corn seeds are inbred seeds. In an embodiment, the corn seeds are transgenic seeds comprising a trait selected from the group consisting of herbicide tolerance, insect resistance, and an agronomic trait.

In an embodiment, one or more seed treatment products comprise an insecticide selected from the group consisting of thiamethoxam, clothianidin, chlorantraniliprole, cyantraniliprole, butenolide, and acetamprid. In an embodiment, one or more seed treatment products comprise a fungicide selected from the group consisting of azoxystrobin, fludioxonil, mefenoxam, thiabendazole, tebuconazol, penthiopyrad and oxathiapiprolin.

A method of increasing crop yield, the method includes:

a. treating a plurality of crop seeds with one or more seed treatment products, wherein the treating is performed using a seed treating equipment positioned within a climate controlled enclosure such that the seed treatment products applied to the seeds are within about −2% to about +2% as compared to the label application rate; and b. providing the treated seeds to a crop growing customer for planting in a crop growing environment, thereby increasing the crop yield.

In an embodiment, the seed treatment products applied to the seeds are within about −1% to about +1% or within about −0.5% to about +0.5% of the label application rate.

In an embodiment, the climate controlled enclosure comprises a humidity sensor. In an embodiment, the climate controlled enclosure is capable of adjusting temperature and humidity based on the type of seed treatment products used.

An environmentally controlled seed treatment system at a seed production facility for delivery of treated seeds to a grower, the system comprising:
a. a seed treating equipment configured to apply a plurality of seed applied components to a plurality of seeds;
b. a first climate controlled chamber to substantially enclose the seed treating equipment, wherein the chamber is capable of maintaining a desired range of temperatures and humidity;
c. a sensor disposed within the chamber, the sensor selected from the group consisting of temperature, humidity, barometric pressure, and air flow sensors.

In an embodiment, the seed treatment equipment in the environmentally controlled seed treatment system is a continuous flow seed treater. In an embodiment, the seed treatment equipment in the environmentally controlled seed treatment system is an unitized batch treater. In an embodiment, the seed treatment equipment in the environmentally controlled seed treatment system comprises a drum treater.

In an embodiment, the chamber is capable of maintaining a temperature range that is about 10° C. to about 22° C. when the seed treating equipment is in operation. In an embodiment, the chamber is capable of maintaining a humidity range that is about 30% to about 40% humidity when the seed treating equipment is in operation.

In an embodiment, the chamber is capable of maintaining a temperature range that is equal to or less than about 25° C. and a humidity range that is equal to or less than 40% humidity when the seed treating equipment is in operation. In an embodiment, the seed treatment system includes both a temperature and a humidity sensor. In an embodiment, the seed treatment system further includes an air flow sensor. In an embodiment, the seed treatment further comprises a barometric pressure sensor.

In an embodiment, the seed treatment system further includes at least one seed treatment product storage station positioned in the first climate controlled chamber.

In an embodiment, the seed treatment system further includes at least one seed treatment product storage station positioned in a second climate controlled chamber located outside the first climate controlled chamber.

An environmentally controlled seed treatment system at a seed production facility for delivery of treated seeds to a grower, the system includes:
a. a seed treating equipment configured to apply a plurality of seed applied components to a plurality of seeds;
b. a plurality of climate controlled chambers to substantially enclose the seed treating equipment, wherein the plurality of the chamber are capable of maintaining a plurality of desired ranges of temperatures and humidity;
c. a sensor disposed within the chamber, the sensor selected from the group consisting of temperature, humidity, barometric pressure, and air flow sensors In an embodiment, multiple chambers are arranged in a series so that treated seeds from a seed treatment equipment in the first chamber is conveyed to a second chamber where a different humidity and/or temperature level is maintained to apply a second seed treatment product that is different than a first seed treatment product applied within the first chamber. Optionally, one of the chambers housing a seed treatment equipment may not be climate controlled compared to another chamber that is climate-controlled. For example, an insecticide seed treatment is applied under temperature and humidity levels in a first chamber that are different than the temperature humidity levels in a second chamber where a biological seed treatment is applied.

In an embodiment, a method of evaluating the performance of a seed treatment product under a predetermined environmental condition, the method comprising (a) applying the seed treatment product to a plurality of seeds wherein the seed treatment application is performed using a seed treatment equipment substantially housed within an environmentally controlled chamber; (b) maintaining the predetermined environmental condition selected from the group consisting of temperature, humidity, and barometric pressure during the seed treatment operation, wherein the environmental condition is predetermined based on the environmental condition present in a geographical region; and (c) evaluating the performance of the seed treatment product in the predetermined environmental condition. In an embodiment, the geographical region is characterized as tropical. In an embodiment, the geographical region is characterized as arid.

In an embodiment, the climate controlled enclosure is located at a seed production plant. In an embodiment, the climate controlled enclosure is portable. In an embodiment, the climate controlled enclosure is mounted on one of a trailer and a self-propelled vehicle. In an embodiment, the climate controlled enclosure is sized to house the seed treatment container. In an embodiment, the climate controlled enclosure is sized to house the seed treatment products. In an embodiment, the climate controlled enclosure is sized to house a seed treatment container. In an embodiment, the climate controlled enclosure maintains the seed treatment equipment at a predetermined temperature. In an embodiment, the climate controlled enclosure is located between a source of seed treatment and the seed treatment container, the climate controlled enclosure having a control module to maintain the seed treatment entering the seed treatment container at the predetermined temperature. In an embodiment, the climate controlled enclosure includes a conditioner to increase or decrease humidity of air within the seed treatment container. In an embodiment, the climate controlled enclosure includes a sensor to determine an environmental condition. In an embodiment, the sensor is located within the seed treatment container. In an embodiment, the sensor is located adjacent to the seed treatment container. In an embodiment, the sensor is located adjacent a source of seed treatment. In an embodiment, the sensor is located within the seed treatment container. In an embodiment, the sensor is determines one of temperature, humidity, and atmospheric pressure. In an embodiment, the sensor is connected with the controller. In an embodiment, the climate controlled enclosure is connected with one of a gas source, a humidifier, a dehumidifier, heat exchanger, and a heater. In an embodiment, the climate controlled enclosure is connected with a controller for controlling one of temperature, humidity, and atmospheric pressure within the climate controlled enclosure. In an embodiment, the controller is connected with a plurality of sensors, the sensors measure one of temperature, humidity, and atmospheric pressure within and outside of the climate controlled enclosure. In an embodiment, the step of maintaining an environmental condition includes adjusting one of temperature, humidity, and atmospheric pressure within the climate controlled enclosure based on the difference between the measured one of temperature, humidity, and atmospheric pressure and one of a predetermined temperature, humidity, and atmospheric pressure. In an embodiment, the controller includes a predetermined one of temperature, humidity, and atmospheric pressure level.

In an embodiment, maintenance of a desirable environmental condition includes comparing a measured temperature, humidity, and atmospheric pressure with a predetermined one of temperature, humidity, and atmospheric pressure. In an embodiment, maintenance of a desirable environmental condition includes adjusting one of temperature, humidity, and atmospheric pressure based on a measured one of temperature, humidity, and atmospheric pressure being one of higher or lower than a predetermined one of temperature, humidity, and atmospheric pressure. In an embodiment, the predetermined one of temperature, humidity, and atmospheric pressure includes a range temperatures, humidity, and atmospheric pressures. In an embodiment, one of temperature, humidity, and atmospheric pressure within the climate controlled enclosure is adjusted based, in part, on change in a measured one of temperature, humidity, and atmospheric pressure outside of the climate controlled enclosure. In an embodiment, the controller is connected with one of a gas source, a humidifier, a dehumidifier, heat exchanger, and a heater to one of increase and decrease one of temperature, humidity, and atmospheric pressure within the climate controlled enclosure. In an embodiment, the climate controlled enclosure is located within a housing to provide a separating barrier between the climate controlled enclosure and external elements. In an embodiment, a source of seed treatment is located within a housing to provide a separating barrier between the climate controlled enclosure and external elements. In an embodiment, an intermediate connection between the climate controlled enclosure and a source of seed treatment is located within a housing to provide a separating barrier between intermediate connection and external elements.

The components identified in the drawings are for illustration purposes only and are not intended to depict scale or operational accuracy for the non-identified components. In an illustrated embodiment shown in FIG. 1, plurality of seeds 10 enter a hopper 20 associated with a seed treating equipment 30. The seeds can be treated either continuously or in a batch operation. In the embodiment shown in FIG. 1, the seed treating equipment 30 includes a rotary drum treater. Other treaters such as for example, an unitary batch treater or a continuous flow treater are also within the scope of this disclosure. Further, lab-scale bench seed treaters may also be suitable to operate within the scope of this disclosure. An atomizer 40 to provide the seed treatment products is coupled to the seed treating equipment 30. Seed treatment products are stored in one or more containers 60 and they are pumped or transferred from the containers 60 to the atomizer 40 through one or more connected channels 70. These channels 70 may be made of flexible connectors that are removably connected to the containers 60 and to the seed treating equipment 30 through the atomizer 40 in a closed loop system to reduce exposure of the seed treatment products. The seed treating operation where the seeds are exposed to one or more seed applied components such as, e.g., insecticides, fungicides, biologicals, and polymers is performed for a suitable period, ranging from several minutes to a few hours. The duration may depend on the volume of seeds to be treated, quantity of seed treatment used, environmental factors such as humidity, temperature, the size of the seed treating equipment and the seed type. The treated seed (not shown in the illustrated drawings) is transferred out of the seed treating equipment 30 through outlet 50 for further handling such as for example, drying. In the illustrated embodiment shown in FIG. 1, the seed treating equipment 30 and the containers 60 are positioned within a climate controlled enclosure 80. The climate controlled enclosure 80 includes for example, an environmental chamber or a designated room that houses seed treating components, wherein the chamber or room is specifically designed to regulate humidity and temperatures to simulate conditions occurring in various geographies.

Figure 2:
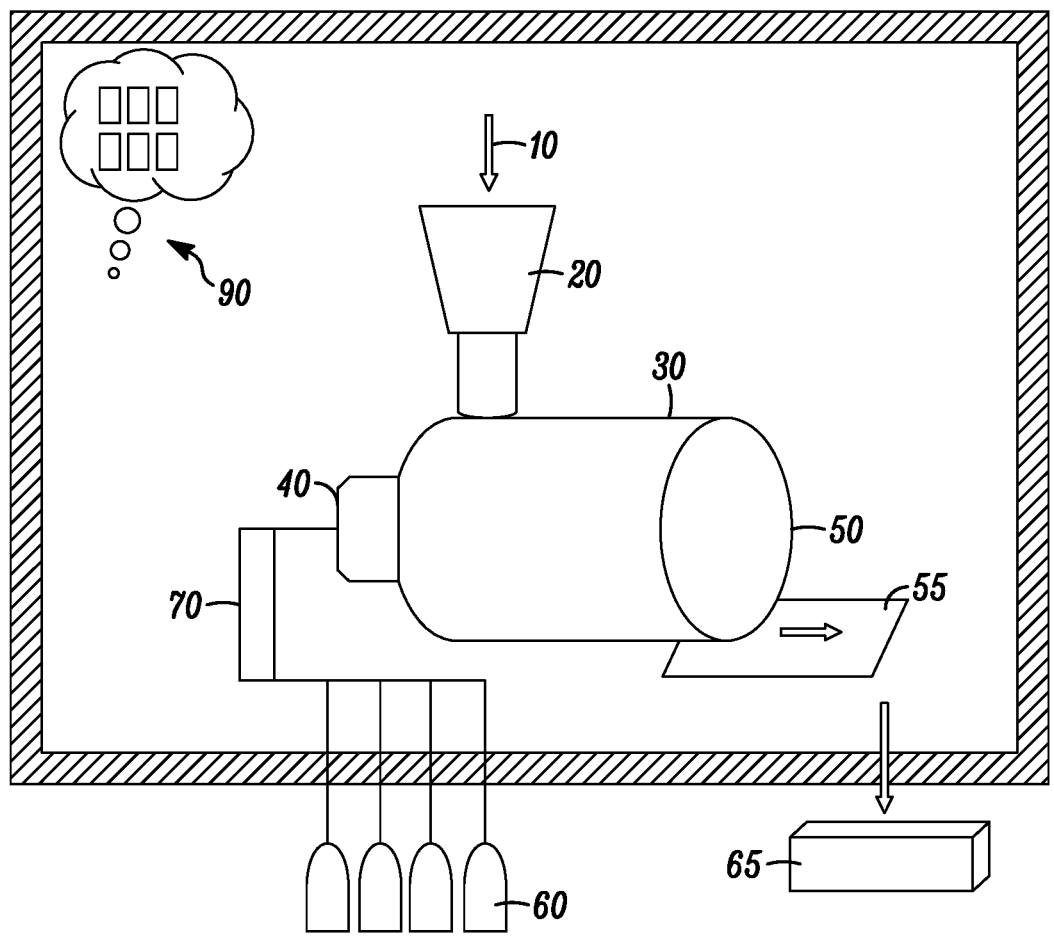
FIG. 2 shows a schematic illustration of a seed treatment application system in an environmentally controlled enclosure, where containers for seed treatment products are positioned outside the enclosure.

As shown in FIG. 1, the climate controlled enclosure 80 has one or more sensors 90 disposed within the enclosure. In an embodiment, the sensors 90 include for example, a humidity sensor, a temperature sensor, an air flow sensor, a GPS, barometric pressure sensor, and a combination thereof. In an embodiment, the enclosure 80 is a chamber. The sensors 90 are designed to communicate to a networked computing environment to supply data to modulate the temperature, humidity, barometric pressure, the air flow or a combination thereof within the enclosure 80. The heating, cooling and other ventilation systems used to modulate environmental factors such as temperature, humidity, barometric pressure and air flow are controlled by a programmable controller. Optionally, a conveyor system 55 is used to transfer the treated seeds for further processing such as drying. In an embodiment, a fluidized bed dryer 65 for drying the seeds treated with the seed treatment product is shown within the enclosure 80 (FIG. 1). In another embodiment, the fluidized bed dryer 65 is shown to be positioned outside the enclosure 80 (FIG. 2). Other dryers for drying the treated seeds are also contemplated within the scope of this disclosure. In an embodiment, a seed treatment facility includes seed/grain conveyance equipment such as a standard conveyors for providing the bulk seed to the seed treating equipment 30 and also a standard conveyor system 55 for transporting the treated seed for further processing or packaging and distribution to customers.

In the illustrated embodiment shown in FIG. 2, the containers 60 having the seed treatment products are positioned outside the climate controlled enclosure 80. For example, in certain situations, to conserve space or to reduce the footprint needed for climate control, the containers 60 may be kept outside the enclosure 80. By maintaining the containers 60 outside the climate controlled enclosure 80, it may result in improved efficiency in changing the seed treatment product containers without substantially affecting the operating conditions within the enclosure 80.

In an embodiment, a seed treatment operation system described herein include one or more computers in a networked environment for obtaining and/or processing data from one or more sensors, seed treatment equipment, controllers operating the seed treatment product containers, heating and cooling systems (HVAC) of the environmentally controlled enclosure or chamber and also through user inputs (e.g., through a touch-screen monitor or keyboards). The networked computer can be a personal computer, a server, a router, a workstation, a microprocessor based device or any other processor-based device connected to a remote server or operating environment through cloud storage. Network interface includes wire and/or wireless communication networks such as local-area networks (LAN), wide-area networks (WAN), WiFi networks, and cellular data networks.

Relative humidity (RH) is generally referred to as the ratio of the partial pressure of water vapor to the equilibrium vapor pressure of water at the same temperature. Relative humidity depends on temperature and the pressure of the system of interest. The relative humidity is also generally referred to the percent of saturation humidity, generally calculated in relation to saturated vapor density.

Relative Humidity(%)=(actual vapor density/saturation vapor density)*100

The common units for vapor density are $g/m^3$.

Dew point generally refers to the temperature, at which the moisture content in the air will saturate the air. If the air is cooled further, some of the moisture will condense.

Climate control or climate controlled generally refers to the control of temperature and relative humidity, in buildings or other enclosed spaces, for a specific process including the operations of machines and materials including seed treatment components such as chemical formulations and biologicals. The terms weather, weather conditions, environment or environmental conditions may also be used to describe the climate-controlled elements of this disclosure.

Suitable ranges of relative humidity within a climate controlled enclosure or chamber include for example of about 10% to about 20%; about 20% to about 30%; about 25% to about 35%; about 30% to about 40%; about 35% to about 45%; about 40% to about 50%; about 45% to about 55%; about 50% to about 60%; about 55% to about 65%; about 60% to about 70%; about 65% to about 75%; about 70% to about 80%; about 75% to about 85%; about 80% to about 90%; and about 85% to about 95%; and any sub-ranges within these exemplified humidity levels are also suitable. Wider ranges of about plus or minus 20% are also suitable for operating the enclosure within a desired humidity level. Operational humidity levels in the various geographical regions can range from about 10% to about 95% depending on the treating season and location. In an embodiment, preferred humidity ranges are about 30% to about 40%. For example, in a production plant, the humidity level maintained within the enclosure is significantly different than the humidity level outside the enclosure, such for example within the building that houses the enclosure. In an embodiment, the humidity level within the enclosure that houses the seed treating equipment is specifically maintained at a predetermined level compared to the humidity level that is maintained in the production plant as a whole. Similarly, in a testing location for evaluating seed treatment formulations, the humidity within the enclosure is maintained at a different level to simulate the prevailing humidity levels of a target geographical location. For example, in an embodiment, the humidity level of the enclosure for a testing center in a North American location may be set to simulate the high humidity levels of a seed treatment location in Brazil for treating soybeans during the summer season. For example, in an embodiment, the humidity level within the enclosure is maintained at a lower level in a production plant in a high humidity production location, to match the desired humidity level for the chosen seed treatment product or products for the target crop. Further, a specific biological component as part of the seed treatment recipe may require a certain humidity and temperature range for increased survivability of the microorganism present in the biological component.

Suitable ranges of temperature within a climate controlled enclosure or chamber include for example of about 0° C. to about 5° C.; 5° C. to about 10° C.; about 10° C. to about 15° C.; about 15° C. to about 20° C.; about 20° C. to about 25° C.; about 30° C. to about 35° C.; about 25° C. to about 30° C.; about 35° C. to about 40° C.; about 40° C. to about 45° C.; about 15° C. to about 17° C.; about 17° C. to about 20° C.; about 22° C. to about 24° C.; about 25° C. to about 28° C.; about 21° C. to about 23° C.; and about 41° C. to about 43° C.; about 43° C. to about 45° C.; and any sub-ranges within these exemplified temperature ranges are also suitable. Wider temperature ranges of about plus or minus 10° C. are also suitable for operating the enclosure within a desired temperature level. Operational temperature levels in the various geographical regions can range from about 1° C. to about 45° C. depending on the treating season and location. In an embodiment, preferred temperature ranges are about 50° F. to about 70° F. (or about 10° C. to 22° C.). For example, in a production plant, the temperature level maintained within the enclosure is significantly different than the temperature level outside the enclosure, such for example within the building that houses the enclosure. In an embodiment, the temperature level within the enclosure that houses the seed treating equipment is specifically maintained at a predetermined level compared to the temperature level that is maintained in the production plant as a whole. Similarly, in a testing location for evaluating seed treatment formulations, the temperature within the enclosure is maintained at a different level to simulate the prevailing temperature levels of a target geographical location. For example, in an embodiment, the temperature level of the enclosure for a testing center in a North American location may be set to simulate the higher temperature levels of a seed treatment location in Brazil for treating soybeans during the summer season. For example, in an embodiment, the temperature level within the enclosure is maintained at a lower level in a production plant in a high temperature production location, to match the desired temperature level for the chosen seed treatment product or products for the target crop. Further, a specific biological component as part of the seed treatment recipe may require a certain humidity and temperature range for increased survivability of the microorganism present in the biological component.

One or more microprocessor-based devices are used to obtain and process data from one or more sensors and thereby control the HVAC systems to maintain a desired range of humidity and temperature in the enclosure. Such devices are programmable so that for a certain seed treatment recipe, a particular range of temperature and humidity levels are maintained automatically without specific user input to adjust the individual settings for the temperature and humidity controllers. For example, after a seed treatment recipe and crop type are input into a master computing system (e.g., a computer), the devices that modulate the climate-controlled enclosure will automatically receive instructions from the master computing system to set the temperature and humidity levels that have been previously determined to work optimal for the chosen seed treatment recipe.

In an embodiment, the climate controlled enclosure (e.g., a room or a chamber within a building) maintains a desired level of humidity and temperature independent of the humidity levels that exist inside a seed treatment equipment where the seeds are contacted with a plurality of seed treatment products.

As used herein and in the appended claims, the singular forms "a", "an", and "the" include plural reference unless the context clearly dictates otherwise. Thus, for example, reference to "a plant" includes a plurality of such plants, reference to "a cell" includes one or more cells and equivalents thereof known to those skilled in the art, and so forth.

As used herein, the terms "cultivar" and "variety" refer to a group of similar plants that by structural and/or genetic features and/or performance can be distinguished from other members of the same species.

As used herein, "crop growing environment" generally refers to one or more environmental considerations such as soil moisture, temperature, humidity, pest or disease pressure, day length, soil type, soil nutrient, and any other environmental factor that has a material impact on the germination and growth of crop plants such as corn, soybean, canola, rice, wheat, cotton, sorghum, barley and others.

The term "effective amount" as used herein as it relates to crop yield or crop vigor refers to an amount of compound effective to increase crop yield or crop vigor.

"Crop yield" as defined herein refers to the return of crop material obtained after harvesting a plant crop. An increase in crop yield refers to an increase in crop yield relative to an untreated control crop.

"Crop vigor" refers to rate of growth or biomass accumulation of a crop plant. An "increase in vigor refers" to an increase in growth or biomass accumulation in crop plants relative to an untreated control crop.

As used herein, the phrase "determining the genotype" or "analyzing genotypic variation" or "genotypic analysis" of an individual refers to determining at least a portion of the genetic makeup of an individual and particularly can refer to determining genetic variability in an individual that can be used as an indicator or predictor of a corresponding phenotype. Determining a genotype can comprise determining one or more haplotypes or determining one or more polymorphisms exhibiting linkage disequilibrium to at least one polymorphism or haplotype having genotypic value. Determining the genotype of an individual can also comprise identifying at least one polymorphism of at least one gene and/or at one locus; identifying at least one haplotype of at least one gene and/or at least one locus; or identifying at least one polymorphism unique to at least one haplotype of at least one gene and/or at least one locus. Genotypic variations may also include inserted transgenes or other changes engineered in the host genome.

As used herein, the term "hybrid", when used in the context of a plant, refers to a seed and the plant the seed develops into that results from crossing at least two genetically different plant parents.

As used herein, the term "inbred" refers to a substantially or completely homozygous individual or line. It is noted that the term can refer to individuals or lines that are substantially or completely homozygous throughout their entire genomes or that are substantially or completely homozygous with respect to subsequences of their genomes that are of particular interest.

As used herein, "seed applied component" generally refers to a seed coating material that may include for example, a fungicide or an insecticide or a nematicide or a biological component, or a polymer or a combination of such seed coating agents. Generally, a coating that is applied exogenously to a seed to promote one or more desirable characteristics of the seed or the seedling or the plant is considered a seed applied component.

As used herein, the terms "trait" and "trait of interest" refer to a phenotype of interest, a gene that contributes to a phenotype of interest, as well as a nucleic acid sequence associated with a gene that contributes to a phenotype of interest. Any trait that would be desirable to screen for or against in subsequent generations can be a trait of interest. Exemplary, non-limiting traits of interest include yield, disease resistance, agronomic traits, abiotic traits, kernel composition (including, but not limited to protein, oil, and/or starch composition), insect resistance, fertility, silage, and morphological traits. In some embodiments, two or more traits of interest are screened for and/or against (either individually or collectively) in progeny individuals.

A propagule (e.g., a seed) can also be coated with a composition comprising a biologically effective amount of a seed applied component. The coatings of the disclosure are capable of effecting a slow release of a desirable compound by diffusion into the seed and surrounding medium. Coatings include dry dusts or powders adhering to the propagule by action of a sticking agent such as methylcellulose or gum arabic. Coatings can also be prepared from suspension concentrates, water-dispersible powders or emulsions that are suspended in water, sprayed on the propagule in a tumbling device and then dried. Formula I compounds that are dissolved in the solvent can be sprayed on the tumbling propagule and the solvent then evaporated. Such compositions preferably include ingredients promoting adhesion of the coating to the propagule. The compositions may also contain surfactants promoting wetting of the propagule. Solvents used must not be phytotoxic to the propagule; generally water is used, but other volatile solvents with low phytotoxicity such as methanol, ethanol, methyl acetate, ethyl acetate, acetone, etc. may be employed alone or in combination. Volatile solvents are those with a normal boiling point less than about 100° C. Drying must be conducted in a way not to injure the propagule or induce premature germination or sprouting.

All neonicotinoids act as agonists at the nicotinic acetylcholine receptor in the central nervous system of insects. This causes excitation of the nerves and eventual paralysis, which leads to death. Due to the mode of action of neonicotinoids, there is no cross-resistance to conventional insecticide classes such as carbamates, organophosphates, and pyrethroids. A review of the neonicotinoids is described in Pestology 2003, 27, pp 60-63; Annual Review of Entomology 2003, 48, pp 339-364; and references cited therein.

Neonicotinoids act as acute contact and stomach poisons, combine systemic properties with relatively low application rates, and are relatively nontoxic to vertebrates. There are many compounds in this group including the pyridylmethylamines such as acetamiprid and thiacloprid; nitromethylenes such as nitenpyram and nithiazine; nitroguanidines such as clothianidin, dinotefuran, imidacloprid and thiamethoxam.

There are many known insecticides, acaricides and nematicides as disclosed in The Pesticide Manual 13th Ed. 2003 including those whose mode of action is not yet clearly defined and those which are a single compound class including amidoflumet (S 1955), bifenazate, chlorofenmidine, dieldrin, diofenolan, fenothiocarb, flufenerim (UR-50701), metaldehyde, metaflumizone (BASF-320), methoxychlor; bactericides such as streptomycin; acaricides such as chinomethionat, chlorobenzilate, cyhexatin, dienochlor, etoxazole, fenbutatin oxide, hexythiazox and propargite.

The weight ratios of a desirable compound (e.g., a diamide) in the mixtures, compositions and methods of the present disclosure are typically from 150:1 to 1:200, preferably from 150:1 to 1:50, more preferably from 50:1 to 1:10 and most preferably from 5:1 to 1:5. Of note are mixtures, compositions and methods wherein component (b) is a compound selected from (b1) neonicotinoids and the weight ratio of component (b) to the compound of Formula 1, an N-oxide, or a salt thereof is from 150:1 to 1:200. Also of note are mixtures, compositions and methods wherein component (b) is a compound selected from (b2) cholinesterase inhibitors and the weight ratio of component (b) to the compound of Formula 1, an N-oxide, or a salt thereof is from 200:1 to 1:100. Also of note are mixtures, compositions and methods wherein component (b) is a compound selected from (b3) sodium channel modulators and the weight ratio of component (b) to the diamide, an N-oxide, or a salt thereof is from 100:1 to 1:10.

TABLE A

Exemplary Seed treatment combination list

| Crop/Seed Treatment Combinations | Either alone or in combination with or more of the following components | | |
|---|---|---|---|
| | Insecticide | Fungicide | Other Seed Treatment Components |
| Corn | Thiamethoxam, Clothianidin, Chlorantraniliprole, Cyantraniliprole, Butenolide, Acetamiprid | Azoxystrobin, Fludioxonil, Mefenoxam, Thiabendazole, Tebuconazol, Penthiopyrad, oxathiapiprolin | *Bacillus firmus* I-1582, *Bacillus subtilis*, *Bacillus simplex*, Abamectin, Polymeric Polyhydroxy Acids |
| Soybean | Imidacloprid, Thiamethoxam, Chlorantraniliprole, Cyantraniliprole, Butenolide | Metalaxyl, Trifloxystrobin, Penthiopyrad, oxathiapiprolin, Sedaxane, Penflufen, Prothioconazole, Difenoconazole, fluopyram | *Bradyrhizobium japonicum*, *Bacillus firmus* I-1582, *Bacillus subtilis*, *Bacillus simplex*, *Pasteuria nishizawae* |
| Canola | Thiamethoxam, Clothianidin, Chlorantraniliprole, Cyantraniliprole, Butenolide | Metalaxyl, Picoxystrobin, Penthiopyrad, Difenoconazole, Trifloxystrobin, Penflufen, Fludioxonil | *Penicillium bilaii*, |

EXAMPLES

The present disclosure is further illustrated in the following Examples. It should be understood that these Examples, while indicating embodiments of the invention, are given by way of illustration only. Thus, various modifications in addition to those shown and described herein will be apparent to those skilled in the art from the foregoing description. Such modifications are also intended to fall within the scope of the appended claims.

Example 1

Seed Treatment Evaluations Under Controlled Environments in a Testing Center

Figure 3:
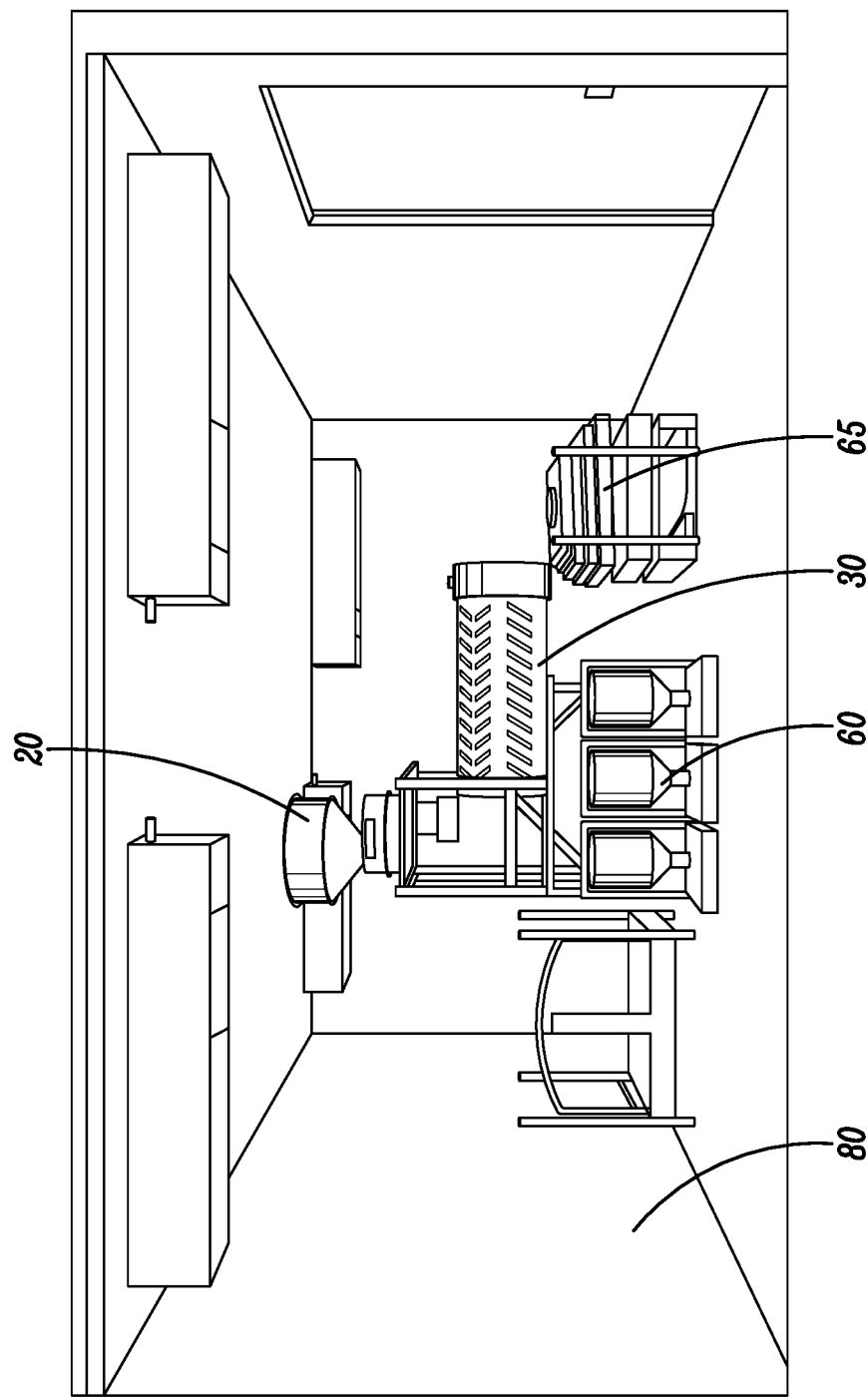
FIG. 3 shows an illustration of a set up of an climate-controlled environmental chamber that contains a drum seed treater and a fluidized bed dryer.

A seed treatment testing facility was built with a climate-controlled environmetal chamber, where the humidity and temperature levels were adjusted to simulate real-world seed treating conditions. An illustration of climate-controlled chamber (also designated as an environmental chamber) is shown in FIG. 3. The seeds were sent for treating through a hopper 20. The seed treatment equipment 30 (a drum treater in this illustrated embodiment) is connected to a plurality of containers 60 that included seed treatment products. This climate-controlled chamber or enclosure 80 contained a seed treating equipment 30 (a drum treater), where a plurality of corn and soybean seeds were treated with a plurality of seed treatment products that included insecticides, fungicides, and biologicals. An exemplary seed treatment combinations are provided in Table A. The climate-controlled chamber/enclosure 80 also contained a fluidized bed dryer 65 for drying the treated seeds. The humidity and temperature levels were adjusted to evaluate the performance of different formulations of seed treatment products on crop seeds such as corn and soybeans. The appearance of the treated seed, loading analysis, and other performance metrics were evaluated. The environmental chambers and the facility had appropriate dust collection systems and air filter panels.

Example 2

Seed Treatment Applications Under Climate Controlled Conditions in a Production Plant or Retail Location A production facility where seeds for commercial production and distribution to retail customers and growers includes an environmental chamber or a climate-controlled enclosure for treating seeds under predetermined or preselected temperature and humidity levels that appropriate for the chosen seed treatment recipe. In an embodiment, the production facility uses a continuous flow seed treater with the plurality of seed treatment products are pumped into the seed treatment equipment. In an embodiment multiple environmental chambers are used successively to treat the same batch of seeds with a plurality of products that require varying temperature and/or humidity levels. Optionally, when multiple environmental chambers are used, treated seeds from the first environmental chamber may be partially or fully dried prior to treating the same batch of seeds in the second environmental chamber.

In an embodiment, the containers having the seed treatment products may be housed within the environmental chambers or they can be stored outside the chambers and optionally at a different environment setting. The treated seeds are conveyed by a suitable conveyor system for further processing, such as, for example, drying in a seed dryer and then for loading, packaging and distribution to a grower customers.

A production facility can handle bulk seed treatment of crop seeds including for example, corn, soybean, canola, wheat, sunflower, and alfalfa seeds. Batch seed treaters are also suitable for use within the climate-controlled chambers.

Example 3

Developing Seed Treatment Formulations for Certain Environmental Conditions

A seed treatment formulation may perform better under a certain environmental condition (e.g., temperate) versus others (e.g., tropical). It is desirable to evaluate seed treatment formulations under real-world environmental conditions before commercial-level deployment of those formulations for various geographical regions that may have extreme environmental conditions. It is also desirable to evaluate the performance of a seed treatment product under a target environmental condition so that the application rate and any addition of binders/polymers can be optimized for the target environmental condition. In an embodiment, a test formulation for a seed treatment is evaluated under a variety of environmental conditions that are maintained within an environmental chamber that houses the seed treatment equipment. Addition of binders, polymers, colorants, and other parameters such as flow rate, treatment time are adjusted under predetermined ranges of varying humidity and/or temperature levels for a test formulation on a chosen seed type. Evaluation criteria include for example, flowability, plantability, tachyness, seed coating uniformity, dust-off levels, application accuracy of labeled rates and treated seed appearance.

In addition, the treated seeds can also be evaluated for stability, germination rate, bio availability of one or more seed treatment components, biological efficacy of biological components applied to the seeds (e.g., microorganisms or biologically-derived products) under environmental conditions that prevail in a targeted geographical region where the treated seeds will be stored before planting. Such environmental conditions are created within one or more environmental chambers where the temperature and humidity levels are modulated to simulate real-world storage conditions. For example, a North American seed treatment facility can have a plurality of appropriately sized environmental chambers that can maintain different temperature and humidity conditions. In an embodiment, for example, if the treated seeds are planned to be stored in a storage facility for several months, those conditions that occur over the several months within that storage facility are simulated within the chamber to evaluate the performance of the seed applied components as described herein.

What is claimed is:

1. A method of developing a seed treatment formulation for a plurality of seeds in a seed treatment application system, the method comprising providing one or more components and coating the one or more components to the plurality of seeds in the seed treatment application system to develop the seed treatment formulation based on one or more environmental conditions of a geographical location, wherein the entire seed treatment application system is housed in an environmentally controlled portable chamber and wherein the chamber is designed to simulate the one or more environmental conditions for the particular seed treatment recipe at the geographical location, wherein the environmental conditions are selected from the group consisting of temperature, humidity, barometric pressure, and a combination thereof; and developing the seed treatment formulation by modifying the one or more seed treatment components based on the one or more environmental conditions for the geographical location.

2. The method of claim 1, wherein the environmental condition is modulated based on previously determined environmental conditions for the geographical location.

3. The method of claim 1, wherein the environmental condition is selected based on the geographical location, timing of application, presence or absence of one or more seed applied components or formulations thereof, type of seeds, seed size, seed shape, volume of seeds being treated, seed treatment rate, nature of the seed treating equipment, volume of the chamber, or a combination thereof.

4. The method of claim 1, wherein the seeds are selected from the group consisting of corn, soybean, canola, rice, wheat, sorghum, sunflower and alfalfa.

5. The method of claim 1, wherein the coating is performed in a continuous flow seed treating equipment.

6. The method of claim 1, wherein the coating is performed in a batch seed treating equipment.

7. The method of claim 1, wherein the chamber comprises a sensor selected from the group consisting of temperature, humidity, barometric pressure, air flow, and a combination thereof, wherein the sensor is disposed within the chamber.

8. The method of claim 7, wherein the sensor is not disposed within the seed treatment application system.

* * * * *